April 16, 1963 D. RICHMAN 3,086,173

BALANCED PHASE-DETECTION SYSTEM

Filed March 23, 1955 2 Sheets-Sheet 1

United States Patent Office 3,086,173
Patented Apr. 16, 1963

3,086,173

BALANCED PHASE-DETECTION SYSTEM

Donald Richman, Fresh Meadows, N.Y., assignor to Hazeltine Research, Inc., Chicago, Ill., a corporation of Illinois Filed Mar. 23, 1955, Ser. No. 496,171
14 Claims. (Cl. 328—134)

GENERAL

The invention relates to balanced phase-detection systems and, particularly, to such systems including a plurality of balanced output circuits each for developing a signal balanced with respect to a reference potential and representing different but correlated phase relations of a pair of applied signals. Though the invention is not limited thereto, such balanced phase-detection systems can be employed to utilize a received color burst synchronizing signal for effecting synchronization of the color-signal deriving circuits of an NTSC type of color-television receiver and the invention will be described in such environment.

In an NTSC type of color-television receiver a locally generated signal, having different phases as applied to different synchronous detectors, is heterodyned in such detectors with a received subcarrier wave signal modulated at specific phases by different color-signal components to derive such components therefrom. In order to effect faithful derivation of such color-signal components, the phases of the locally generated signal as applied to the different synchronous detectors are controlled by means of a received color-synchronizing or burst signal. Such control may be effected by means of conventional automatic-phase-control (APC) circuits wherein the color burst and locally generated signals are compared in phase in a balanced phase detector to develop a control signal representative of any deviation from a desired phase relationship of these signals. However, preferably, such phase control is effected by means of an APC system having a more sensitive control over a greater range of phase deviations and having improved stability. An APC system with the latter characteristics is described in an article entitled "The DC Quadricorrelator; A Two-Mode Synchronization System" at pages 288–299, inclusive, of the January 1954 issue of the Proceedings of the I.R.E. and employs not only a pair of balanced phase detectors in which the two applied signals are maintained in quadrature phase by utilizing any deviation from quadrature phase to control the operation of the local generator but, in addition, includes another pair of balanced phase detectors in which, when the signal developed by the local generator is properly phased under the control of the first pair of phase detectors, the two applied signals are in phase or antiphase. The first balanced detector, a common part of most conventional APC systems, is conventionally referred to as a quadrature-phase detector while the second is designated an in-phase detector. The in-phase detector develops a control signal which is employed to control the the sensitivity of the quadrature-phase detector or to increase the range of phase deviations over which it will respond or to perform both functions. In addition, such in-phase control signal may be employed for other purposes such as to develop a color-killer bias potential for use in the chrominance channel as described in the aforesaid I.R.E. article. Prior to the present invention, the equivalent of four tubes in terms of electron paths has been required to develop the two output signals representing quadrature-phase and in-phase relations of the color burst and locally generated signals. It is desirable to reduce the number of tubes and at the same time retain the benefits of quadrature-phase and in-phase detection.

It is, therefore, an object of the present invention to provide a new and improved balanced phase-detection system which does not have the limitations of prior phase-detection systems.

It is an additional object of the present invention to provide a new and improved balanced phase-detection system for effecting quadrature-phase and in-phase detection which utilizes a minimum of tubes.

It is also an object of the present invention to provide a new and improved balanced phase-detection system of inexpensive construction for effecting quadrature-phase and in-phase detection.

In accordance with the present invention, a balanced phase-detection system comprises means for supplying a pair of signals preferably having substantially the same frequency and related in phase. The phase-detection system also comprises a plurality of unidirectionally conductive devices and means for applying the pair of signals to the devices including a phase-shift network intercoupling the devices for applying at least one of the signals thereto with different phases and with a substantially constant ratio of magnitudes. The phase-detection system comprises, in addition, a plurality of intercoupled low-frequency load circuits for the devices including a plurality of balanced output circuits numbering one less than the number of devices for developing in different ones of the output circuits balanced output potentials representative of different correlated phase relationships of the supplied signals.

For a better understanding of the present invention, together with other and further objects thereof, reference is had to the following description taken in connection with the accompanying drawings, and its scope will be pointed out in the appended claims.

Referring to the drawings.

Figure 1:
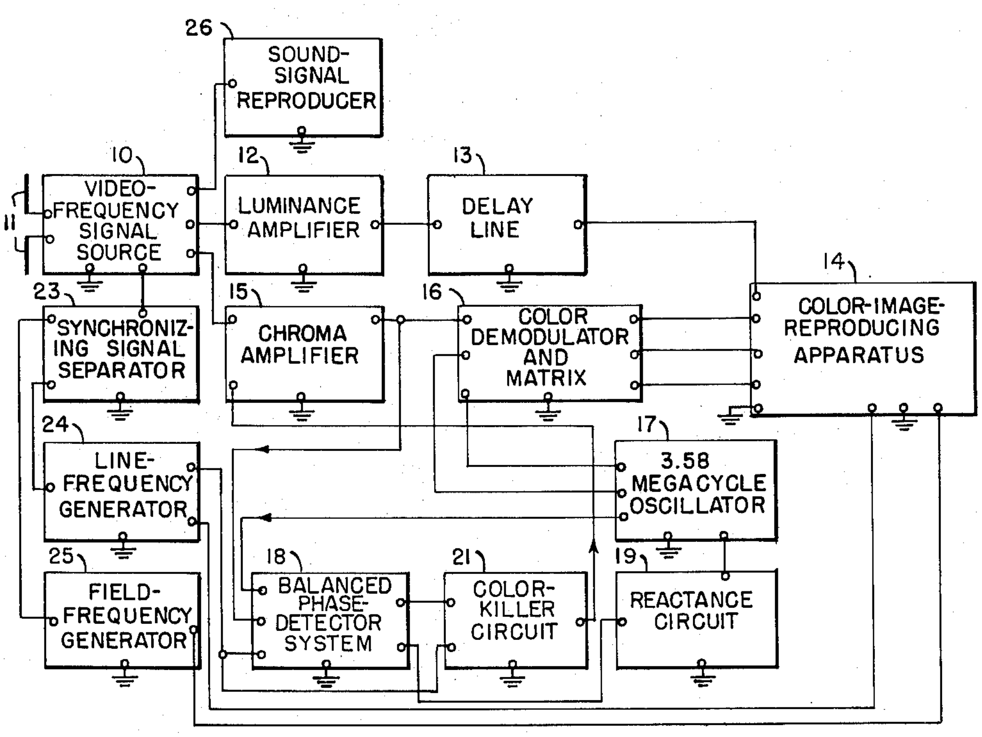
FIG. 1 is a schematic diagram of a color-television receiver including a balanced phase-detection system constructed in accordance with the present invention.
Figure 2:
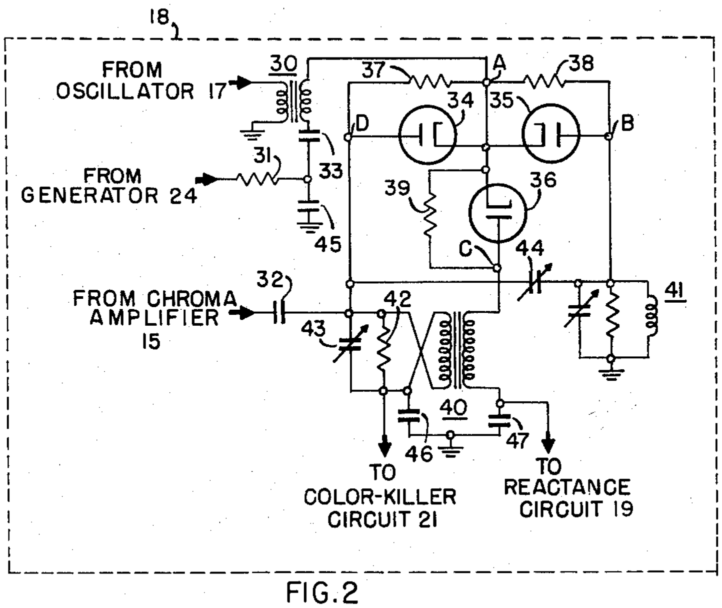
FIG. 2 is a detailed circuit diagram of one embodiment of the phase-detection system of FIG. 1.
Figure 2A:
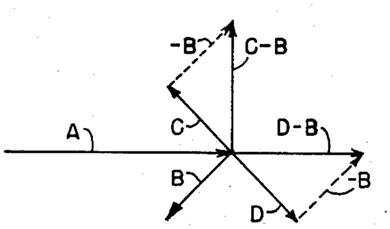
Figure 3:
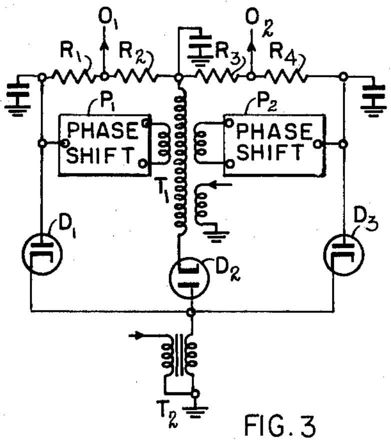
Figure 4:
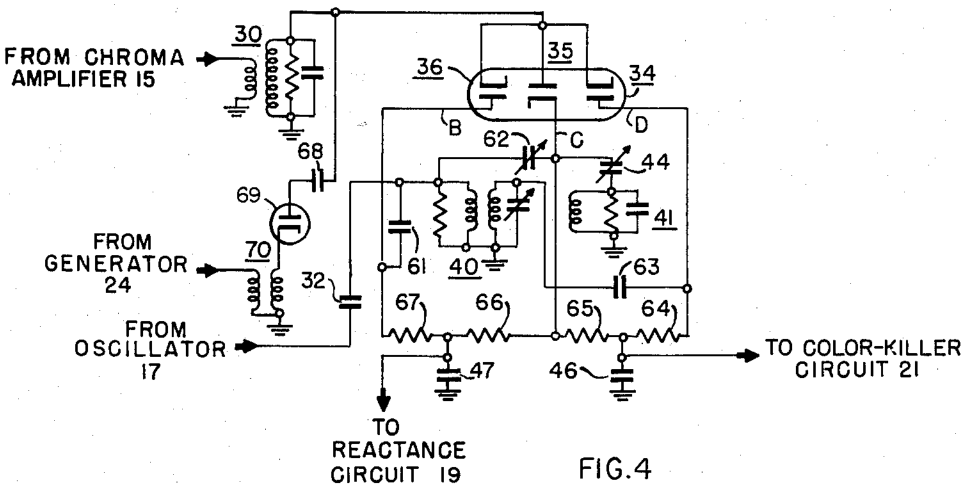
Figure 5:
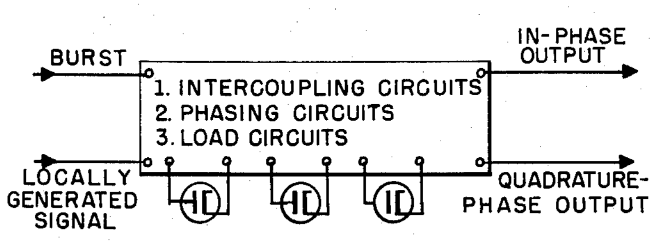
Figure 4A:
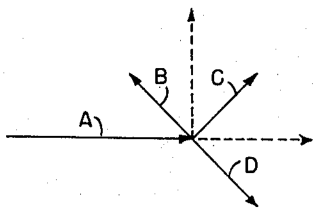

FIG. 2*a* is a vector diagram useful in explaining the operation of the embodiment of FIG. 2;

FIG. 3 is a diagram representing the phase-detection system of FIG. 1 and useful in explaining such system;

FIG. 4 is a detailed circuit diagram of another embodiment of the phase-detection system of FIG. 1;

FIG. 4*a* is a vector diagram useful in explaining the operation of the phase-detection system of FIG. 4, and FIG. 5 is another diagrammtic representation of a phase-detection system in accordance with the present invention.

*General Description of Color-Television Receiver of Fig. 1*

Referring now more particularly to FIG. 1 of the drawings, there is represented a color-television receiver of a compatible type suitable for utilizing an NTSC type of color-television signal. Such receiver includes a video-frequency signal source 10 which may, for example, comprise a radio-frequency amplifier having an input circuit coupled to an antenna 11, an oscillator-modulator, an intermediate-frequency amplifier, and a video-frequency signal detector. An output circuit of the source 10 is coupled through a luminance channel, specifically, through a luminance amplifier 12 and a delay line 13, in cascade in the order named, to an input circuit of a color-image-reproducing apparatus 14. The luminance amplifier 12 may be a conventional wide band amplifier having, for example, a pass band of approximately 0–4.2 megacycles. The delay line 13 may be a conventional line for equating the time of travel of the signal through the units 12 and 13 with that for the chrominance signal through a chrominance channel to be described hereinafter. The color-image-reproducing apparatus 14 may be of conventional construction for utilizing signals representative of luminance and chrominance, or components derived therefrom, to reproduce a color image.

An output circuit of the video-frequency signal source is also coupled through a chrominance channel to input circuits of the apparatus 14. Such chrominance channel may comprise, in cascade in the order named, a chroma amplifier 15 and a color demodulator and matrix circuit 16. The chroma amplifier may be a conventional unit having a pass band of approximately 2–4.2 megacycles for translating the modulated subcarrier wave signal and its side bands. The color demodulator and matrix circuit 16 may comprise conventional synchronous detectors for deriving color-difference signals from specific phases of the modulated subcarrier wave signal and a conventional matrix circuit for combining such derived signals to develop, for example, the color-difference signals $R-Y$, $B-Y$, and $G-Y$, representative, respectively, of the red, blue, and green components of a televised color image. A pair of output circuits of a 3.58 megacycle oscillator 17 is coupled to a pair of input circuits of the unit 16 for applying properly phased, locally generated signals to the synchronous detectors in the unit 16 to effect faithful derivation of the desired modulation components from specific phases of the subcarrier wave signal.

The output circuit of the chroma amplifier 15 and an output circuit of the oscillator 17 are coupled to different input circuits of a balanced phase-detector system 18 constructed in accordance with the present invention and to be described more fully hereinafter. An output circuit of the detector system 18 is coupled through a reactance circuit 19 to an input circuit of the oscillator 17. Another output circuit of the detector system 18 is coupled through a color-killer circuit 21 to a gain-control circuit of the amplifier 15. A color killer such as represented by the unit 21 is more completely described in the aforementioned article in the January 1954 issue of the Proceedings of the I.R.E.

An output circuit of the video-frequency signal source 10 is also coupled through a synchronizing-signal separator 23 to input circuits of a line-frequency generator 24 and a field-frequency generator 25, output circuits of the latter generators being coupled, respectively, to horizontal and vertical deflection windings in the apparatus 14. An output circuit of the generator 24, for example a tap on the horizontal deflection transformer therein, is coupled to input circuits of the phase detector 18 and the color-killer circuit 21.

An additional output circuit of the video-frequency signal source 10 is coupled to a sound-signal reproducer 26 which may include, for example, a sound-signal intermediate-frequency amplifier, a signal detector, an audio-frequency amplifier, and a sound-signal reproducing device such as a loudspeaker.

All of the units thus far described and their combination, with the exception of the balanced phase-detector system 18, may be of conventional construction well known in the color-television art and, therefore, no more detailed description of such units is provided herein.

*General Explanation of Operation of Color-Television Receiver of FIG. 1*

For the purpose of general explanation of the operation of the receiver of FIG. 1, it will initially be assumed that the balanced phase-detector system 18 is of conventional construction and operates in a conventional manner. In the video-frequency signal source 10, a conventional NTSC type of color-television signal may be intercepted by the antenna 11, selected and amplified by the radio-frequency amplifier in such unit, modified to an intermediate frequency by means of an oscillator-modulator, further amplified by means of an intermediate-frequency amplifier, and the modulation components of such intermediate-frequency television signal detected by means of a conventional detection system. Such modulation components comprise a composite color video-frequency signal and an intermediate-frequency sound signal. The composite video-frequency signal includes a luminance component, a chrominance component, and synchronizing components including line-frequency, field-frequency, and color burst synchronizing signals. The luminance component is amplified in the unit 12, delayed in translation by the delay line 13, and applied to a control circuit of the apparatus 14. The chrominance component, comprising a subcarrier wave signal modulated at specific phases by components representative of chrominance, is translated through the amplifier 15 and applied to an input circuit of the color demodulator and matrix 16. In the unit 16, synchronous detectors derive modulation components from specific phases of the subcarrier wave signal by means of a heterodyning of the applied subcarrier wave signal with properly phased signals developed in the oscillator 17. The derived components are combined in a matrix circuit to develop, for example, $R-Y$, $B-Y$, and $G-Y$ color-difference signals. These color-difference signals are applied to input circuits of the apparatus 14 wherein they individually combine with the luminance signal applied to the apparatus 14 to develop, for example, color signals R, G, and B representative, respectively, of the red, green, and blue components of a televised color image.

The line-frequency and field-frequency synchronizing components are separated from other components in the separator 23 and utilized, respectively, to synchronize the operations of the line-frequency generator 24 and field-frequency generator 25 with the operations of corresponding units at the transmitter. The line-frequency and field-frequency signals developed, respectively, by the generators 24 and 25 are employed in the apparatus 14 to effect, respectively, horizontal and vertical deflection of the electron beams in such apparatus to scan a raster on the image screen therein. Such scanning operation, combined with intensity modulation of the electron beams in the apparatus 14 by the three color signals, results in a color reproduction of the televised image.

The color burst synchronizing signal is translated through the amplifier 15 and applied to an input circuit of the balanced phase-detector system 18. The signal developed in the oscillator 17 is also applied to an input circuit of the phase-detector system 18. This detector system is gated into operation at approximately the time of the burst signal by means of a flyback pulse applied thereto by the generator 24 for effecting comparision of the phases of the color burst and locally generated signals therein to develop a control potential. The control potential is applied to the reactance circuit 19 to control the operation of the oscillator 17 to maintain such specific phase relationship of the signals applied to the detector system 18 as desired and thereby maintain the signals applied by the oscillator 17 to the color demodulator and matrix 16 at such phases with respect to the modulated subcarrier wave signal applied to the unit 16 as to effect faithful derivation in the unit 16 of the modulation components at the specific phases of the subcarrier wave signal. A signal developed in the phase-detector system 18 is also applied to the color-killer circuit 21 to control the operation thereof to develop one output signal when a burst is present and a different output signal when a burst is not present. The color-killer circuit 21, under the control of a line flyback pulse applied thereto from the generator 24, develops substantially zero output potential when a color burst signal is present and the signals developed in the oscillator 17 are properly phased, and develops a large negative potential when such color burst signal is not present or the signals developed in the oscillator 17 are not properly phased. Such large negative potential is applied to the gain-control circuit of the amplifier 15 to render such amplifier nonconductive when either of the latter conditions exists.

The intermediate-frequency sound signal developed in the source 10 is applied to the sound-signal reproducer 26 wherein it is further amplified and the sound-signal components thereof derived. These derived components are amplified in an audio-frequency amplifier and utilized in a sound-signal reproducing device, such as a loudspeaker, to reproduce sound.

*Description of Balanced Phase-Detection System of FIGS. 1 and 2*

Considering now in detail an embodiment of the balanced phase-detection system 18 of FIG. 1, specifically the embodiment represented in FIG. 2, such phase-detection system comprises means for supplying a pair of signals preferably having substantially the same frequency and related in phase. Specifically, such supply means comprises a coupling condenser 32 and the conductor connecting such condenser to the output circuit of, for example, the chroma amplifier 15 for supplying the color burst signal and also includes a transformer 30 having the primary winding thereof coupled to the oscillator 17 of FIG. 1 for supplying a controllable phase or locally generated signal. The locally generated signal and color burst signal have the same frequency of approximately 3.58 megacycles and should be specifically related in phase. The supply means may also include a circuit for supplying a gating signal, for example, a negative horizontal flyback pulse. Specifically, the latter circuit comprises a resistor 31 and a condenser 33 coupling an output circuit of the line-frequency generator 24 to the secondary winding of the transformer 30. The circuit including the resistor 31 and the condenser 33 is not required if the color burst signal is of sufficient amplitude to effect the required gating operation of the detector diodes.

The phase-detection system of FIG. 2 also includes only three unidirectionally conductive devices, specifically, the diodes 34, 35, and 36 having, respectively, load resistors 37, 38 and 39 shunted thereacross. The cathodes of the diodes are interconnected.

The phase-detection system of FIG. 2 also includes means for applying the locally generated and color burst signals to the diodes including a phase-shift network intercoupling the diodes for applying at least one of the aforesaid pair of signals to the diodes with different phases and with a substantially constant ratio of magnitudes. More specifically, such applying means comprises, for the locally generated signal, the secondary winding of the transformer 30 coupled to the interconnected cathodes of the diodes 34, 35, 36. This circuit also applies the negative line-frequency flyback pulse to the interconnected cathodes.

For applying the color burst signal, the phase-detection system includes a phase-shift network comprising a transformer 40 having bifilar windings and a phase-shift circuit 41. The primary winding of the transformer 40 is broadly tuned to the frequency of the color burst signal by means of a shunt condenser 43 and a shunt resistor 42 and, because of the close coupling therebetween, the secondary winding of this transformer is similarly tuned. One terminal of the primary winding is coupled through the condenser 32 to the output circuit of the chroma amplifier 15 and is also connected to the anode of the diode 34. One terminal of the secondary winding is connected to the anode of the diode 36. The phase-shift circuit 41 is connected between the anode of the diode 35 and a reference potential, for example, chassis-ground and is further coupled through a phase-control condenser 44 to the primary winding of the transformer 40. To cause the circuit 41 and the condenser 44 to have the proper phase delay without unwanted envelope delay, the condenser 44 is large with relation to the shunt condenser in the circuit 41 so that the combination of the condenser 44 and the circuit 41 has nearly the characteristics of a delay line, that is, equal phase and envelope delays and appears as a substantially resistive load with respect to the transformer 40.

The primary and secondary windings of the transformer 40 and the circuit 41 with the circuit elements associated therewith are designed to have such relative impedances that the output voltages developed in these circuits have a substantially constant ratio of magnitudes for reasons to be explained more fully hereinafter. In addition, in order to obtain balanced operation, the impedances of the diode circuits are proportioned so the ratios of the magnitudes of the locally generated signal to the color burst signal in each of the diode circuits are equal. In addition, the relative phase shifts in the primary and secondary windings of the transformer 40 and the circuit 41 are such that the signals applied to the anodes of the diodes 34, 35, and 36 have specific phases with respect to each other as will be explained more fully hereinafter.

The phase-detection system of FIG. 2 also includes a plurality of intercoupled low-frequency load circuits for the diodes including a plurality of balanced output circuits numbering one less than the number of diodes for developing in different ones of the output circuits balanced output potentials representative of different correlated phase relationships of the supplied signals. The condenser 33, having one terminal coupled through a relatively low impedance condenser 45 to the reference potential of chassis-ground and the other terminal coupled through the secondary winding of the transformer 30 to the interconnected cathodes of the diodes 34, 35, and 36, in combination with the resistor 38 provides a low-frequency load circuit for all of these diodes and particularly for the diode 35. The impedance of the circuit including the condenser 33 and the resistor 38 is such as to be relatively low for the color burst and locally generated signals while being substantially high for beat-frequency signals developed from a heterodyning of the color burst and locally generated signals. A condenser 46 is coupled between one terminal of the primary winding of the transformer 40 and the reference potential of chassis-ground to provide, in combination with the resistors 37 and 38, a low-frequency load circuit for the diode 34 and, similarly, a condenser 47 is coupled between a terminal of the secondary winding of the transformer 40 and the reference potential of chassis-ground to provide, in combination with the resistors 38 and 39, a low-frequency load circuit for the diode 36. The condensers 46 and 47 have capacitances of the order of the condenser 33 and, since the condenser 33 is coupled to the cathodes of the diodes 34 and 36 and the condensers 46 and 47 are coupled to the anodes of these diodes, respectively, the load circuits including the condensers 33, 46, and 47 are intercoupled. The ungrounded terminals of the condensers 46 and 47 provide a pair of balanced output circuits in which balanced output potentials representative of quadrature-phase and in-phase relationships of the color burst and locally generated signals are developed. The ungrounded terminal of the condenser 46 may, for example, be connected to the color-killer circuit 21 while the ungrounded terminal of the condenser 47 may be, for example, connected to the reactance circuit 19. If relative phases of the color burst signals different from those described herein as applied to the diodes 34, 35, and 36 are employed, the control potentials developed in the condensers 46 and 47 may be interchanged. In such case, the connections of these condensers to the reactance circuit 19 and the color-killer circuit 21 would be interchanged.

*Explanation of Operation of Balanced Phase-Detection System of FIG. 2*

As previously mentioned herein, prior phase-detection systems for effecting quadrature-phase and in-phase detection, such as described in the aforesaid I.R.E. article, normally employ a pair of balanced phase-detector circuits, that is, utilize four nonlinear elements such as diodes or their equivalent. In accordance with the present invention, the same functions are performed with only three nonlinear elements. The concept that three nonlinear elements may be used for performing all the essential functions of four is best understood by considering the following general approach to the theory of operation of balanced phase detectors.

A conventional single balanced phase detector usually consists of two phase-sensitive detector elements connected in a circuit for adding or subtracting the developed phase-sensitive signals. In each of such detectors, a unidirectional component E, having different magnitudes for different operating conditions, and a differential component $e(\phi)$, the relative magnitude of which varies substantially only with phase, are developed in response to the applied signals. In the balanced phase detector, the unidirectional components E developed by the two detectors, including static operating potentials and noise, balance or cancel each other and the differential components $e(\phi)$ combine to provide a potential which is a measure of the phase difference of the applied signals. In other words, in a balanced phase detector there is symmetry of operation of the two detectors so that the unidirectional components E cancel for a wide range of operating conditions regardless of their magnitudes so that the only output potential is one representing substantially only phase deviation. In order for such cancellation to occur, it is fundamental that the ratio of the unidirectional voltages developed in the two detectors be constant over the range of operating conditions and usually such ratio is unity.

When a pair of balanced phase detectors is employed for in-phase and quadrature-phase purposes, the same conditions hold for each of the pair as related above with respect to the single balanced phase detector. In other words, the detectors of each pair must operate symmetrically so that in each pair the undirectional potentials E cancel and in each pair the components $e(\phi)$ defining the phase differences of the signals combine. The latter components combine in one pair to provide a signal representative of the quadrature-phase relationship of the applied signals and in the other pair to provide a signal representative of the in-phase relationship of these signals. As previously stated, for the detectors in each pair of balanced phase detectors there must be symmetry of operation, that is, the ratio of the unidirectional voltages developed in the two detectors of a pair must be constant over the operating range. However, there need be no symmetry of operation between the two pairs of balanced phase detectors. The unidirectional potentials developed in the two pairs may be completely independent of each other though the $e(\phi)$ potentials are related through their common relation to the phase relationships of the applied signals.

A balanced phase-detection system in accordance with the present invention, employing the equivalent of three instead of four diodes or other nonlinear elements as in the system just considered to provide quadrature-phase and in-phase information, is capable of the same quality of performance as the four-diode system if it has a pair of output circuits at which the unidirectional potentials developed in the three phase detectors cancel each other and at which only $e(\phi)$ potentials representative of the in-phase and quadrature-phase relations of the applied signals are developed.

One form of balanced phase-detection system in accordance with the present invention is diagrammatically represented by FIG. 3. This system includes three diodes $D_1$, $D_2$, $D_3$, a pair of balanced output circuits $O_1$, $O_2$ for developing the in-phase and quadrature-phase potentials, means including a pair of signal sources such as transformers $T_1$, $T_2$, and a pair of phase-shift networks $P_1$, $P_2$ for applying the phase-related signals to the diodes. In addition, the diodes $D_1$ and $D_2$ are interconnected by means of load resistors $R_1$, $R_2$ and diodes $D_2$, $D_3$ are similarly interconnected by means of load resistors $R_3$, $R_4$. The total of the potentials developed in each diode circuit, being the sum of a unidirectional potential E and a differential potential $e(\phi)$, may be designated as $E_1$, $E_2$, and $E_3$ for the diode circuits including the diodes $D_1$, $D_2$, and $D_3$, respectively. The potentials $E_1$, $E_2$, and $E_3$ are definable as follows if the diode circuits are constructed so that the unidirectional potentials E developed in each are equal and the phase-related signals translated through the transformers $T_1$ and $T_2$ are applied to the different diode circuits with different phases as indicated in the following equations:

$$E_1=-E-e(\cos\phi+\sin\phi) \quad (1)$$

$$E_2=E+e(\sin\phi-\cos\phi) \quad (2)$$

$$E_3=-E+e(\sin\phi+\cos\phi) \quad (3)$$

If resistor $R_1$ equals resistor $R_2$, resistor $R_3$ equals resistor $R_4$, and the detector impedances do not change the voltage division ratio, the potentials $E_s$ and $E_\phi$ developed at the output circuits $O_1$ and $O_2$ are definable as follows by utilizing the relationships of Equations 1, 2, and 3:

$$E_s=\tfrac{1}{2}(E_1+E_2) \quad (4)$$

or $$E_s=-e(\cos\phi) \quad (5)$$

and $$E_\phi=\tfrac{1}{2}(E_2+E_3) \quad (6)$$

or $$E_\phi=e(\sin\phi) \quad (7)$$

Equations 5 and 7 demonstrate that the unidirectional potentials E cancel each other at the output circuits $O_1$ and $O_2$ and that potentials determined solely by variations in phase of the two applied signals are developed at these output circuits. These potentials represent different correlated phase relationships of the applied signals, more specifically, they represent in-phase and quadrature-phase relations of the applied signals. When the applied signals are properly phased, the quadrature-phase potential $E_\phi$ averages nominally to zero and the in-phase potential $E_s$ averages to a maximum negative value. When the signals are not properly phased, that is, when these signals are in random phase relation with respect to each other, then no average sin ($\phi$) or cos ($\phi$) potentials are developed because of the random phase relationships and both $E_\phi$ and $E_s$ become equal to zero at such time. These values for $E_\phi$ and $E_s$ are as they should be in a balanced phase-detection system providing quadrature-phase and in-phase information.

The balanced phase-detection system of FIG. 2 operates in a manner somewhat analogous to that of the diagrammatic system of FIG. 3. The phase relations of the signals applied to the diodes 34, 35, and 36 for stable, properly phased signals are represented by the vectors of FIG. 2*a*. In such vector diagram, the vector A represents the phase and relative magnitude of the locally generated signal applied through the transformer 30 to the interconnected cathodes of the diodes 34, 35, and 36. The vector D represents the relative phase and magnitude of the color burst synchronizing signal translated from the chroma amplifier 15 through the condenser 32 and developed across the primary winding of the transformer 40 for application to the anode of the diode 34. The color burst signal developed in such primary winding is inductively coupled to the secondary winding of the transformer 40 to apply a signal having the phase represented by the vector C of FIG. 2*a* to the anode of the diode 36. The signal developed in the primary winding of the transformer 40 is also applied through the phase-adjusting condenser 44 to the tuned circuit 41 for developing a color burst signal having the phase represented by the vector B thereacross and for applying such signal to the anode of the diode 35. The vectors C—B and D—B represent the magnitudes and phases of composite signals effectively applied, respectively, to the anodes of the diodes 36 and 34 as will be explained more fully hereinafter.

During the horizontal flyback period, negative-going flyback pulses are applied through the resistor 31, the condenser 33, and the secondary winding of the transformer 30 to the cathodes of the diodes 34, 35, and 36 rendering such diodes conductive. The color burst signal is applied to these diodes at this time with the phases previously described herein, and as represented by the vectors B, C, and D of FIG. 2*a*, and the locally generated signal is continuously applied with the same phase to the cathodes of these diodes. These two signals are effectively heterodyned by envelope detection in the different diode circuits to develop beat-frequency signals representative of their phase relationship. The load circuit for the signals applied to the diode 35 includes, principally, the condenser 33 while the load circuits for the signals applied to the diodes 34 and 36 include not only the condenser just mentioned but also, respectively, the condensers 46 and 47. The operation of the diodes 34, 35, and 36 to perform both the quadrature-phase and in-phase detection is best explained by considering the operation of these diodes in pairs with the diode 35 common to both pairs.

When the oscillator 17 is synchronized, the color burst signal applied to the anode of the diode 35, represented by the vector B of FIG. 2*a*, heterodynes with the locally generated signal applied to the cathode thereof, represented by the vector A of FIG. 2*a*, when such diode is rendered conductive by the negative-going flyback pulse, to develop across the condenser 33 a potential representative of the phase relation of the applied signals. The signals applied to the diode 36 attempt to develop across the load condenser 47 a potential representative of the phase relation of the vectors C and A of FIG. 2*a*. However, the condenser 33 is also a load condenser for the diode 36 and the potential developed thereacross by the operation of the diode 34 is subtracted from the potential that would otherwise be developed across the condenser 47. Consequently, the latter potential is substantially the same as that which would have been developed if the only signals contributing thereto had the quadrature-phase relationship represented by the vectors A and C—B of FIG. 2*a* provided the signals represented by the vectors B and C are controlled to have the same magnitude. Since such quadrature-phase relationship is conventionally indicative of synchronous operation of the oscillator, the potential developed across the condenser 47 by the operations of the circuits including the diodes 35 and 36 is, in all respects, a quadrature-phase control potential. This potential is zero when the oscillator 17 is synchronized and the vector relationship represented by the vectors A, B, and C of FIG. 2*a* exists and becomes increasingly large and has a characteristic polarity as the oscillator 17 deviates from synchronous operation in either sense. In other words, the combined effect of the signals applied to the diodes 35 and 36 is the equivalent of having a color burst signal, such as represented by the composite vector C—B of FIG. 2*a* for a synchronized condition, applied to these diodes to provide the conventional quadrature relation of the locally generated and color burst signals. When the oscillator deviates from synchronization, the composite vector C—B rotates with respect to the vector A, as in a conventional phase detector, and phase-control potentials are developed across the condenser 47.

As the diodes 35 and 36 provide a balanced quadrature-phase detector, analogously the diodes 34 and 35 provide a balanced in-phase detector. The signals applied to the diodes 34 and 35 cause average currents to flow through these diodes to develop potentials across the condensers 33 and 46. The combined effect of these signals, if the signals represented by the vectors B and D are controlled to have the same magnitude, is the equivalent of having a color burst signal, such as represented by the composite vector D—B of FIG. 2*a* for a synchronized condition, applied to these diodes to develop the in-phase potential. Because of the in-phase relationship of the locally generated signal, represented by the vector A, and the effective signal, represented by the composite vector D—B of FIG. 2*a*, when the oscillator 17 is synchronized, a potential of maximum magnitude is developed across the output condenser 46, when such phasing exists, to provide the in-phase control signal normally employed to control the operation of a color-killer circuit such as the unit 21 of FIG. 1. As previously discussed, the color-killer circuit conditions the chrominance channel to be conductive or nonconductive during picture periods when a color burst signal is, respectively, present or absent.

In summary, though the phase-detector system of FIG. 2 employs only three diodes, the circuits coupling these diodes and the phasing and magnitudes of the locally generated and color burst signals applied to these diodes are such as to develop in the output condensers 46 and 47, respectively, in-phase and quadrature-phase control potentials.

Though the invention is not limited thereto, the following circuit constants have been found suitable in the detection system of FIG. 2:

| | |
|---|---|
| Diodes 34, 35, 36 | Type 6T8 vacuum tube. |
| Resistor 31 | 1 kilohm. |
| Resistors 37, 38, 39 | 1 megohm. |
| Resistor 42 | 4.7 kilohms. |
| Resistor in circuit 41 | 3.3 kilohms. |
| Condensers 33, 46, 47 | 390 micromicrofarads. |
| Condenser 44 | 7–45 micromicrofarads. |
| Condenser 45 | 1000 micromicrofarads. |
| Voltage of flyback pulse | 100 volts peak-to-peak. |
| Amplitude of color burst signal | 30 volts peak-to-peak. |
| Amplitude of locally generated signal | 100 volts peak-to-peak. |

*Description and Explanation of Operation of Balanced Phase-Detection System of Fig. 4*

In the balanced phase-detection system of FIG. 4 more complex phase-shifting and load circuits are utilized closely resembling those used in the diagrammatic circuit of FIG. 3 and the diodes are keyed by means of the color burst signal rather than by means of a horizontal flyback pulse as in the system of FIG. 2. Otherwise, the design and operation of the systems of FIGS. 2 and 4 are similar and, therefore, similar circuit elements are identified by the same reference numerals.

The transformer 30 is broadly tuned to the frequency of the color burst synchronizing signal, that is, approximately to the frequency of 3.58 megacycles and couples such signal from a source, such as the chroma amplifier 15, to interconnected cathodes of the diodes 34 and 36 and to the anode of the diode 35. A gating circuit for the color burst synchronizing signal includes a diode 69 effectively coupled in parallel with the secondary winding of the transformer 30. The diode 69 has an anode coupled through a condenser 68 to one terminal of the secondary winding of the transformer 30 and the cathode thereof coupled through the secondary winding of a transformer 70 to the grounded terminal of the secondary winding of the transformer 30. The primary of the transformer 70 is connected to a source of negative gating signal such as a tap on a winding of the deflection transformer in the line-frequency generator 24.

The primary winding of the bifilar transformer 40, responsive to the locally generated signal applied through the condenser 32, is coupled to the anode of the diode 36 through an isolating condenser 61 and to the phase-shift circuit 41 through the series-connected condensers 62 and 44 with the cathode of the diode 35 coupled to the junction of the condensers 44 and 62. The secondary of the transformer 40 is coupled through another isolating condenser 63 to the anode of the diode 34. A pair of load resistors 66 and 67 is coupled in series between the anode of the diode 36 and the cathode of the diode 35 with the junction of these resistors coupled through the output condenser 47 to a source of reference potential, for example, chassis-ground. A pair of load resistors 64 and 65 is coupled in series between the cathode of the diode 35 and the anode of the diode 34 with the junction of these resistors coupled through the output condenser 46 to chassis-ground. The isolating condensers 44, 61, 62, and 63 are for the purpose of isolating the unidirectional potentials developed in the resistor circuits 64, 65, 66, 67 from the transformer 40 and the phase-shift circuit 41.

In operation, the gating diode 69 provides a low-impedance shunt across the secondary winding of the transformer 30 except when a negative flyback pulse is applied to the primary of the transformer 70 thereby causing the cathode of the diode 69 to be positively biased. When such occurs, the color burst signal is translated from the chroma amplifier 15 through the transformer 30 and applied to the cathodes of the diodes 34 and 36 and to the anode of the diode 35. When the oscillator 17 of FIG. 1 is properly synchronized, such color burst signal has the phase and magnitude represented by vector A of FIG. 4*a* with respect to the locally generated signal as represented by the other vectors in FIG. 4*a*. At the time the color burst signal is applied to the cathodes of the diodes 34 and 36 and the anode of the diode 35, the locally generated signal translated through the condenser 32 from the oscillator 17 is applied to the primary of the bifilar transformer 40 and through the condenser 61 to the anode of the diode 36 with the phase and magnitude represented by vector B of FIG. 4*a*. The locally generated signal is also applied from the secondary winding of the transformer 40 through the condenser 63 to the anode of the diode 34 with the phase and magnitude represented by vector D and is also applied from the primary of the transformer 40 through the condensers 44 and 62 to the circuit 41. The phase and magnitude of the signal applied by the series circuit of the condenser 44 and the phase-shift circuit 41 to the cathode of the diode 35 are represented by vector C of FIG. 4*a*. The diodes 36 and 35 develop average unidirectional potentials across the resistors 66 and 67 in in the manner more fully described with reference to the diagrammatic circuit of FIG. 3. The potential developed at the junction of these resistors across the condenser 47, as has been described with reference to FIG. 3, is the quadrature-phase control potential. Similarly, the diodes 35 and 34 develop average unidirectional potentials across the resistors 64 and 65. The potential developed at the junction of these resistors across the output condenser 46 is the in-phase control potential previously discussed herein.

The above analysis with respect to FIG. 3, and the description of the embodiments of FIGS. 2 and 4 assumed pairing of the diodes to provide the pair of balanced phase detectors. Thus, in FIG. 3 the detectors including the diodes $D_1$ and $D_2$ are paired to provide the potential $E_\phi$ at the output circuit $O_1$ and the detectors including the diodes $D_2$ and $D_3$ are paired to provide the potential $E_s$ at the output circuit $O_2$. Similarly, in FIGS. 2 and 4 the diodes 35 and 36 are paired to provide the quadrature-phase potential across a condenser 47 and the diodes 34 and 35 are paired to provide the in-phase potential across a condenser 46. There is no basic requirement that such detectors be paired to provide potentials representative of different phase relations of two applied signals in a pair of balanced output circuits. Actually, instead of using only signal components from pairs of detectors, components of the potentials developed by the three detectors may be combined to develop the $E_s$ and $E_\phi$ output potentials. For example, as represented by FIG. 5, the potentials $E_s$ and $E_\phi$ may be defined as follows:

$$E_s = aE_1 + bE_2 + cE_3 \quad (8)$$

and $$E_\phi = xE_1 + yE_2 + zE_3 \quad (9)$$

where $a$, $b$, $c$ and $x$, $y$, $z$ are constants of proper proportions to combine the potentials $E_1$, $E_2$, and $E_3$ to make the equations valid. The unidirectional potentials $E_{u1}$, $E_{u2}$, and $E_{u3}$, as components of the terms $E_1$, $E_2$, and $E_3$ in such equations, must cancel if balanced detection is to be obtained. In other words:

$$aE_{u1} + bE_{u2} + cE_{u3} = 0 \quad (10)$$

and $$xE_{u1} + yE_{u2} + zE_{u3} = 0 \quad (11)$$

The differential potentials $e_1(\phi)$, $e_2(\phi)$, and $e_3(\phi)$, as components of the terms $E_1$, $E_2$, and $E_3$ and which vary with phase to provide the in-phase and quadrature-phase potentials, are definable as follows:

$$k_1[ae_1(\phi) + be_2(\phi) + ce_3(\phi)] = \pm \cos \phi \quad (12)$$

and $$k_2[xe_1(\phi) + ye_2(\phi) + ze_3(\phi)] = \pm \sin \phi \quad (13)$$

With the parameters of the three detector circuits so defined, many arrangements thereof may be employed in terms of such parameters to provide in-phase and quadrature-phase output potentials. Also, though in-phase and quadrature-phase potentials are normally the potentials desired in accordance with the invention, potentials representative of any selected pair of correlated phases of applied signals may be developed.

In the following claims where reference is made to either maximum or minimum voltages, it will be understood that the terms are used without regard to polarity since either positive or maximum negative voltages may be used depending upon the circuit construction.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A balanced phase-detection system comprising: means for supplying a pair of signals desirably in-synchronism at a desired phase relationship but which may be undesirably out of such synchronism; only three unidirectional conductive devices; and circuit means intercoupling said supply means and devices in two pairs constituting two balanced phase detectors for applying said signals to the detectors at such magnitudes and phases as to produce in one of the detectors a first balanced control voltage for bringing the signals into such synchronism at said desired phase relationship and in the other detector a second balanced control voltage for indicating whether the signals are out of or in such synchronism at said desired phase relationship.

2. A balanced phase-detection system for a television receiver comprising: means for supplying a synchronizing signal and a locally generated signal desirably in-synchronism at a desired phase relationship but which may be undesirably out of such synchronism; only three unidirectional conductive devices; and circuit means intercoupling said supply means and devices in two pairs constituting two balanced phase detectors for applying said signals to the detectors at such magnitudes and phases as to produce in one of the detectors a first balanced control voltage for bringing the signals into such synchronism at said desired phase relationship and in the other detector a second balanced control voltage for indicating whether the signals are out of or in such synchronism at said desired phase relationship.

3. A balanced phase-detection system comprising: means for supplying a pair of signals desirably in-synchronism at a quadrature phase relationship but which may be undesirably out of such synchronism; only three unidirectional conductive devices; and circuit means intercoupling said supply means and devices in two pairs constituting two balanced phase detectors for applying said signals to the detectors at such magnitudes and phases as to produce in one of the detectors a first balanced control voltage for bringing the signals into such synchronism at said quadrature phase relationship and in the other detector a second balanced control voltage for indicating whether the signals are out of or in such synchronism at said desired phase relationship.

4. A balanced phase-detection system for a color-television receiver comprising: means for supplying a color burst synchronizing signal and a locally generated signal desirably in-synchronism at a quadrature phase relationship but which may be undesirably out of such synchronism; only three unidirectional conductive devices; and circuit means intercoupling said supply means and devices in two pairs constituting two balanced phase detectors for applying said signals to the detectors at such magnitudes and phases as to produce in one of the detectors a first balanced control voltage for bringing the signals into such synchronism at said quadrature phase relationship and in the other detector a second balanced control voltage for indicating whether the signals are out of or in such synchronism at said desired phase relationship.

5. A balanced phase-detection system comprising: means for supplying a pair of signals desirably in-synchronism at a desired phase relationship but which may be undesirably out of such synchronism; only three unidirectional conducitve devices; and circuit means intercoupling said supply means and devices in two pairs constituting two balanced phase detectors for applying said signals to the detectors at such magnitudes and phases as to produce in one of the detectors a first balanced control voltage which minimizes as the signals approach such synchronism at said desired phase relationship and in the other detector a second balanced control voltage which maximizes as the signals approach such synchronism at said desired phase relationship but is substantially less at other phase relationships for indicating whether the signals are out of or in such synchronism at said desired phase relationship.

6. A balanced phase-detection system for a color-television receiver comprising: means for supplying a color burst synchronizing signal and a locally generated signal desirably in-synchronism at a desired phase relationship but which may be undesirably out of such synchronism; only three unidirectional conductive devices; and circuit means intercoupling said supply means and devices in two pairs constituting two balanced phase detectors for applying said signals to the detectors at such magnitudes and phases as to produce in one of the detectors a first balanced control voltage which minimizes as the signals approach such synchronism at said desired phase relationship and in the other detector a second balanced control voltage which maximizes as the signals approach such synchronism at said desired phase relationship but is substantially less at other phase relationships for indicating whether the signals are out of or in such synchronism at said desired phase relationship.

7. A balanced phase-detection system comprising: means for supplying a pair of signals desirably in-synchronism at a desired phase relationship but which may be undesirably out of such synchronism; only three unidirectional conductive devices; and circuit means including load circuits having a common portion and phase-shift means intercoupling said supply means and devices in two pairs constituting two balanced phase detectors for applying said signals to the detectors at such magnitudes and phases as to produce in one of the detectors a first balanced control voltage for bringing the signals into such synchronism at said desired phase relationship and in the other detector a second balanced control voltage for indicating whether the signals are out of or in such synchronism at said desired phase relationship.

8. A balanced phase-detection system for a color-television receiver comprising: means for supplying a color burst synchronizing signal and a locally generated signal desirably in-synchronism at a desired phase relationship but which may be undesirably out of such synchronism; only three unidirection conductive devices; and circuit means including load circuits having a common portion and phase-shift means intercoupling said supply means and devices in two pairs constituting two balanced phase detectors for applying said signals to the detectors at such magnitudes and phases as to produce in one of the detectors a first balanced control voltage which minimizes as the signals approach such synchronism at said desired phase relationship and in the other detector a second balanced control voltage which maximizes as the signals approach such synchronism at said desired phase relationship but is substantially less at other phase relationships for indicating whether the signals are out of or in such synchronism at said desired phase relationship.

9. A phase-detection system for a pair of signals comprising: only three unidirectional conductive devices and circuits interconnecting one pair of the same as a balanced phase detector of a desired phase relationship of said signals and another pair as a balanced phase detector of another phase relationship of said signals for indicating whether the signals are out of of in synchronism at said desired phase relationship.

10. A phase-detection system for a synchronizing signal and a locally generated signal of a television receiver comprising: only three unidirectional conductive devices and circuits interconnecting one pair of the same as a balanced phase detector of a desired phase relationship of said signals and another pair as a balanced phase detector of another phase relationship of said signals for indicating whether the signals are out of or in synchronism at said desired phase relationship.

11. A phase-detection system for a pair of signals comprising: only three unidirectional conductive devices and circuits interconnecting one pair of the same as a balanced phase detector of a quadrature phase relationship of said signals and another pair as a balanced phase detector of another phase relationship 90° from the quadrature phase relationship of said signals for indicating whether the signals are out of or in synchronism at said quadrature phase relationship.

12. A phase-detection system for a color burst synchronizing signal and a locally generated signal of a color-television receiver comprising: only three unidirectional conductive devices and circuits interconnecting one pair of the same as a balanced phase detector of a quadrature phase relationship of said signals and another pair as a balanced phase detector of another phase relationship 90° from the quadrature phase relationship of said signals for indicating whether the signals are out of or in synchronism at said quadrature phase relationship.

13. A phase-detection system for a pair of signals comprising: only three unidirectional conductive devices and circuits interconnecting one pair of the same as a balanced phase detector for producing a first control voltage which is minimum at a desired phase relationship of said signals and another pair as a balanced phase detector for producing a second control voltage which is maximum at said desired phase relationship but substantially less at other phase relationships of said signals for indicating whether the signals are in or out of synchronism at said desired phase relationship.

14. A phase-detection system for a color burst synchronizing signal and a locally generated signal of a color-television receiver comprising: only three unidirectional conductive devices and circuits interconnecting one pair of the same as a balanced phase detector for producing a first control voltage which is minimum at a desired phase relationship of said signals and another pair as a balanced phase detector for producing a second control voltage which is maximum at said desired phase relationship but substantially less at other phase relationships of said signals for indicating whether the signals are in or out of synchronism at said desired phase relationship.

References Cited in the file of this patent

UNITED STATES PATENTS

| | | |
|---|---|---|
| 2,588,094 | Eaton | Mar. 4, 1952 |
| 2,640,939 | Staschover | June 2, 1953 |
| 2,666,136 | Carpenter | Jan. 12, 1954 |
| 2,698,899 | Boelens | Jan. 4, 1955 |
| 2,703,380 | Fraser | Mar. 1, 1955 |
| 2,718,546 | Schlesinger | Sept. 20, 1955 |
| 2,808,508 | Sinninger | Oct. 1, 1957 |